(12) United States Patent
Flenche

(10) Patent No.: US 9,915,262 B2
(45) Date of Patent: Mar. 13, 2018

(54) PUMP AND/OR COMPRESSOR ARRANGEMENT INCLUDING MATING, OSCILLATABLE VANE MEMBERS FOR THE SIMULTANEOUS ADMISSION AND DISCHARGE OF FLUID

(71) Applicant: EXODUS R&D INTERNATIONAL PTE LTD, Salisbury (AU)

(72) Inventor: George Flenche, Salisbury (AU)

( * ) Notice: Subject to any disclaimer, the term of this patent is extended or adjusted under 35 U.S.C. 154(b) by 620 days.

(21) Appl. No.: 14/375,617

(22) PCT Filed: Feb. 4, 2013

(86) PCT No.: PCT/AU2013/000094
§ 371 (c)(1),
(2) Date: Jul. 30, 2014

(87) PCT Pub. No.: WO2013/113073
PCT Pub. Date: Aug. 8, 2013

(65) Prior Publication Data
US 2014/0377113 A1    Dec. 25, 2014

(30) Foreign Application Priority Data
Feb. 2, 2012 (AU) ................................. 2012900371

(51) Int. Cl.
*F04C 9/00* (2006.01)
*F01C 1/063* (2006.01)
(Continued)

(52) U.S. Cl.
CPC ............. *F04C 9/002* (2013.01); *F01C 1/063* (2013.01); *F01C 1/067* (2013.01); *F01C 1/07* (2013.01);
(Continued)

(58) Field of Classification Search
CPC ........... F04C 9/002; F01C 1/063; F01C 1/067
(Continued)

(56) References Cited

U.S. PATENT DOCUMENTS 1,010,583 A    12/1911  Carmichael et al.
3,702,746 A *  11/1972  Parmerlee ............... F01C 1/063
                                                    123/18 R
(Continued)

FOREIGN PATENT DOCUMENTS

WO    WO2011057345    5/2011
WO    WO2011057348    5/2011
WO    WO2012019604    2/2012

*Primary Examiner* — Charles Freay
*Assistant Examiner* — Christopher Bobish
(74) *Attorney, Agent, or Firm* — The Webb Law Firm

(57) ABSTRACT

The present invention relates to an apparatus for pumping or compressing a fluid, the apparatus characterized by a compression chamber including an inlet and outlet, opposed front and rear vane members disposed inside said compression chamber, each vane member including at least one axially extending vane segment and at least one radially disposed open segment adapted to receive a vane segment of the opposed vane member, wherein adjacent vane segments of mating vane members form radial compartments there between. The assembly further includes a swing arm assembly for effecting equal and opposite rotational oscillation of the front and rear vane members such that adjacent vane segments oscillate toward and away from one another simultaneously, thereby creating a bellowing effect which draws fluid into the chamber via the inlet and discharges fluid out of the chamber via the outlet. The invention further relates to an assembly for translating rotational motion of an input shaft to oscillatory motion of the vane members.

29 Claims, 11 Drawing Sheets

(51) Int. Cl.
  *F01C 1/067*  (2006.01)
  *F04C 28/14*  (2006.01)
  *F01C 21/10*  (2006.01)
  *F04C 29/12*  (2006.01)
  *F16H 25/16*  (2006.01)
  *F01C 1/07*  (2006.01)
  *F04C 15/06*  (2006.01)

(52) U.S. Cl.
  CPC ............ *F01C 21/10* (2013.01); *F04C 15/068* (2013.01); *F04C 28/14* (2013.01); *F04C 29/128* (2013.01); *F16H 25/16* (2013.01); *F04C 2230/603* (2013.01); *Y10T 74/18288* (2015.01)

(58) Field of Classification Search
  USPC ................. 417/481; 92/122, 121; 418/35–38
  See application file for complete search history.

(56) References Cited

U.S. PATENT DOCUMENTS

| | | | | |
|---|---|---|---|---|
| 4,029,059 A * | 6/1977 | Coston | ..................... | F01C 9/002 |
| | | | | 123/18 R |
| 4,385,873 A * | 5/1983 | Richter | ................. | F01C 21/089 |
| | | | | 418/23 |
| 6,270,322 B1 * | 8/2001 | Hoyt | ....................... | F01C 9/002 |
| | | | | 123/18 A |
| 6,321,693 B1 * | 11/2001 | Kim | ........................ | F01C 9/002 |
| | | | | 123/18 R |
| 7,827,901 B2 * | 11/2010 | Kudarauskas | ........... | B60K 6/24 |
| | | | | 91/339 |

* cited by examiner

PUMP AND/OR COMPRESSOR ARRANGEMENT INCLUDING MATING, OSCILLATABLE VANE MEMBERS FOR THE SIMULTANEOUS ADMISSION AND DISCHARGE OF FLUID

FIELD OF THE INVENTION

The present invention relates to a pump or compressor unit which can function to compress or accelerate a fluid such as air, gas, gaseous mixtures and/or liquid. In particular, the invention relates to a pump and/or compressor including a swing arm assembly for translating rotational motion of a driveable shaft into equal and opposite oscillatory motion of mating vane members to thereby effect a simultaneous admission and discharge of fluid. The invention further relates to the assembly for translating rotational motion of the driveable shaft to oscillatory motion of the vane members.

BACKGROUND OF THE INVENTION

For the most part pumps and compressors utilise a mechanical action so as to force an admitted fluid drawn into the system to increase its velocity which is then converted into pressure or alternatively a pumping action.

Typically compressors and pumps based around a piston connected to a crank has the piston reciprocating in the cylinder and the reciprocating action results in pumping fluid which passes into the cylinder. The pump is typically electrically powered, for example by a motor or even in some cases internal combustion motors and so forth.

As the person skilled in the art is well aware one disadvantage of this type of pump is that pumping occurs only when the piston is in the compressive stroke. When a piston is in the drawdown stroke, no pumping occurs as the drawdown stroke is required to suck additional fluid into the cylinder or housing.

Therefore, half the action of the piston does not contribute to the pumping action.

There are a variety of other problems with such arrangements not the least wherein the piston has a short stroke and this results in increased wear and tear on the pump. As is to be expected these types of piston pumps generally suffer from excessive noise levels making them unsuitable for many applications.

While there are alternatives to piston based pumps and compressors for the most part these centre around rotary volumetric designs, typically with radial vanes driven by an electric motor. These kinds of pumps and compressors draw fluid from the atmosphere through an intake opening directed to a pressure tank through a minimum pressure valve which opens only when a predetermined minimum pressure has been reached within the compressor unit or pump apparatus.

One of the main disadvantages of rotary volumetric type based compressors and pump apparatus is the intermittent operation type control system which means that the operation of the electric motor is suspended when the pressure reaches the upper limit value. While this may reduce electric power loss and improve consumption of the arrangement, since the motor is started over again and again from the stationary state, when the pressure falls thereafter it is impossible to promptly supply compressed air or a pumping action when required.

The present Applicant is the owner of international patent application no. PCT/AU2010/001515 "Fluid compressor or pump apparatus" relating to an arrangement that overcomes some of the abovementioned problems. Whilst effective, the need for a still further improved pump and/or compressor arrangement has been recognised.

It is therefore an object of this invention to provide a fluid compressor and/or pump apparatus which overcomes at least some of the above mentioned disadvantages. Further objects and advantages of this invention will become apparent from a complete reading of the specification.

From hereonafter throughout this specification the use of the word compressing is to be considered synonymous with the ability to also pump therefore while the apparatus described throughout this invention may relate to the compressing of a fluid, it is to be appreciated by the person skilled in the art that the apparatus defined is equally capable of pumping fluid. In addition, reference to the word "fluid" is intended to be encompass air, gas, gaseous mixtures, liquids, or any other medium which may require compressing and/or pumping.

SUMMARY OF THE INVENTION

According to an aspect, the present invention provides an apparatus for pumping or compressing a fluid, the apparatus characterised by a compression chamber including an inlet and outlet, and opposed front and rear vane members disposed inside said compression chamber, each vane member including at least one axially extending vane segment and at least one radially disposed open segment adapted to receive a vane segment of the opposed vane member, wherein adjacent vane segments of mating vane members form radial compartments there between; a means of effecting equal and opposite rotational oscillation of the front and rear vane members such that adjacent vane segments oscillate toward and away from one another simultaneously, thereby creating a bellowing effect which draws fluid into the chamber via the inlet and discharges fluid out of the chamber via the outlet.

Advantageously, this arrangement provides for a mechanism in which fluid can be admitted and then discharged continuously from the compression chamber.

In an embodiment, the front vane member includes inlet apertures to admit fluid to each radial compartment and the rear vane member includes outlet apertures to discharge fluid from each radial compartment.

In an embodiment, the inlet and outlet apertures are a series of holes formed in a base of each of the front and rear vane members.

In an embodiment, each inlet aperture in a radial compartment includes one way valve means configured to be closed when adjacent vane segments move toward one another to thereby compress and discharge compressed fluid, and open when the adjacent vane segments move away from each other a sufficient distance to admit fluid into the compartments.

In an embodiment, said one way valve means are in the form of reed valves.

In an embodiment, each outlet aperture in a radial compartment includes one way valve means configured to be at least partially opened when adjacent vane segments move toward one another to thereby compress and discharge compressed fluid, and close when adjacent vane segments move away from each other a sufficient distance to admit fluid into the compartments.

In an embodiment, the apparatus further includes a drive portion supporting a rotatably driveable shaft in operable communication with a compression portion including said compression chamber.

In an embodiment, said drive portion is an electric motor.

In an embodiment, said means of effecting oscillation is a swing arm assembly adapted to translate the rotatable motion of the drivable shaft into a back and forth oscillation movement of the front and rear vane members.

In an embodiment, said swing arm assembly includes a front swing arm and a rear swing arm disposed forwardly and rearwardly of said front and rear vane members respectively, each swing arm having an opening there through for accommodating the driveable shaft and eccentric cams associated therewith.

In an embodiment, each swing arm is moveable such that lower ends thereof are pivotable about a common pivot axis disposed above the driveable shaft axis in a pendulum motion, said motion being by virtue of contact between the rotating front and rear eccentric cams and an internal edge of each said openings.

In an embodiment, a horizontal dimension of each opening is such that the corresponding eccentric cam contacts the internal edge on either side of the opening and thereby swings the swing arm when the driveable shaft is rotated.

In an embodiment, the front and rear eccentric cams are arranged in a radially opposed configuration such that rotation of the driveable shaft causes the front and rear swing arms to move in equal and opposite directions.

In an embodiment, the front and rear swing arms include inwardly disposed lever arms configured to swing in unison with the swing arms by virtue of a pivotable connection at their respective lower ends, the upper ends of each lever arm being rotatable about the driveable shaft axis and associated with said front and rear vane members to effect equal and opposite rotational oscillation thereof.

In an embodiment, the upper end of each lever arm is internally splined and adapted to mate with a splined annulus associated with each vane member.

In an embodiment, said compression chamber includes a main housing in which is housed said front and rear mating vane members, a front housing in which is housed said front swing arm, and a rear housing in which is housed said rear swing arm.

In an embodiment, said compression chamber further includes front and rear plates disposed between the front and main housing and the main and rear housing respectively, wherein an inlet chamber is defined between said front plate and front vane member, and an outlet chamber is defined between said rear vane member and rear plate.

In an embodiment, said compression chamber inlet and outlet are in the form of slots in said main housing extending into each of said inlet and outlet chambers respectively.

In an embodiment, each opposed and mating front and rear vane member includes five radially disposed and axially extending vane segments, between which are defined the open segments for receiving opposed vane segments and allowing for their rotation, thereby defining ten radial compartments such that each revolution of the driveable shaft affords movement of each swing arm in one direction during which five compartments are drawing fluid in and five compartments are discharging fluid.

Therefore, swinging of the front and rear swing arms by virtue of the eccentric cams causes swinging of the lower ends of each lever arm, which in turn causes the front and rear vane members to oscillate in equal and opposite directed relative to one another.

Through the use of the swing arm assembly, each vane member is thus rotated back and forth relative to the other to create a bellowing effect that can provide both a suction or vacuuming effect but at the same time a pumping effect.

While one edge of the vane segments moves up against the edge of an adjacent vane segment and compressing air, the other side of the segment is in fact admitting fluid therein to this particular radial compartment by virtue of the fact that the inlet apertures have been allowed to open thereby allowing the admission of the fluid therein to the radial compartment.

Nonetheless on the other side of the vane segment which has had its inlet hole covered by the segment no fluid is being admitted but the fluid inside that compartment is being compressed and therefore has no alternative but to exit this compartment through the one way valve.

As can be seen, in a plurality of such radial compartments, there is the simultaneous capability of providing not only a suction or vacuuming effect to admit fluid but also the ability to in fact pressurise fluid into a confined space and then discharge it out of the compressor chamber through the use of the one way valve control.

Hence when the vane segments oscillate and rotate back and forth by virtue of the swing arm assembly such that some segments are moving toward one another and other segments away from one another, and this means that on the side of the vane segment to which spacing within the compartment is increasing it can absorb or suck fluid into the compressor chamber and accordingly then on the other side where the vane segment is pushed up against another vane segment, compressed fluid can be created discharges.

Preferably the pressure admission and discharge levels can be set by adjusting the one way inlet and outlet valves meaning that once the fluid has been compressed to its required level it can then be discharged accordingly.

Hence for each cycle, the equal and opposite movement of the front and rear vane members will be providing or allowing fluid to be admitted into the inlet apertures which are not closed by the rear vane segments, and will be pressurising and discharging fluid out of the outlet apertures which are not closed by the front vane segments.

According to another aspect, the present invention provides an assembly for translating rotational motion of an input shaft into oscillatory motion of first and second mating vane members used to pump and/or compress fluid by virtue of said motion, the assembly including: a first swing arm and a second swing arm disposed forwardly and rearwardly of said first and second mating vane members respectively, wherein each swing arm and vane member includes a co-axial opening for accommodating the input shaft, and each swing arm is pivotable about a common pivot axis disposed above the input shaft axis;

eccentric cams associated with the input shaft and arranged such that each eccentric cam contacts an internal edge of the swing arm openings to thereby effect a pendulum type motion of the swing arms about said common axis when the input shaft is rotated, said cams being arranged in a radially opposed configuration such that rotation of the input shaft causes the swing arms to move in equal and opposite directions; and lever arms associated with each swing arm configured to move substantially in unison with the swing arms by virtue of a pivotable connection at their respective lower ends, the upper ends of each lever arm being rotatable about the driveable shaft axis and operatively coupled to said first and second vane members to effect equal and opposite rotational oscillation thereof.

DESCRIPTION OF DRAWINGS

The above and other objects, features, and advantages of the present invention will be apparent from the following detailed description of a preferred embodiment in conjunction with the accompanying drawings. In the drawings.

DESCRIPTION OF THE EMBODIMENT(S) OF THE INVENTION

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

The present invention relates, according to one aspect, to a swing arm assembly 10 or assembly for translating rotational motion to oscillatable motion for use in a fluid compressor or pump apparatus 12, and in another aspect, to a fluid compressor or pump apparatus 12 incorporating the swing arm assembly 10.

Figure 1:
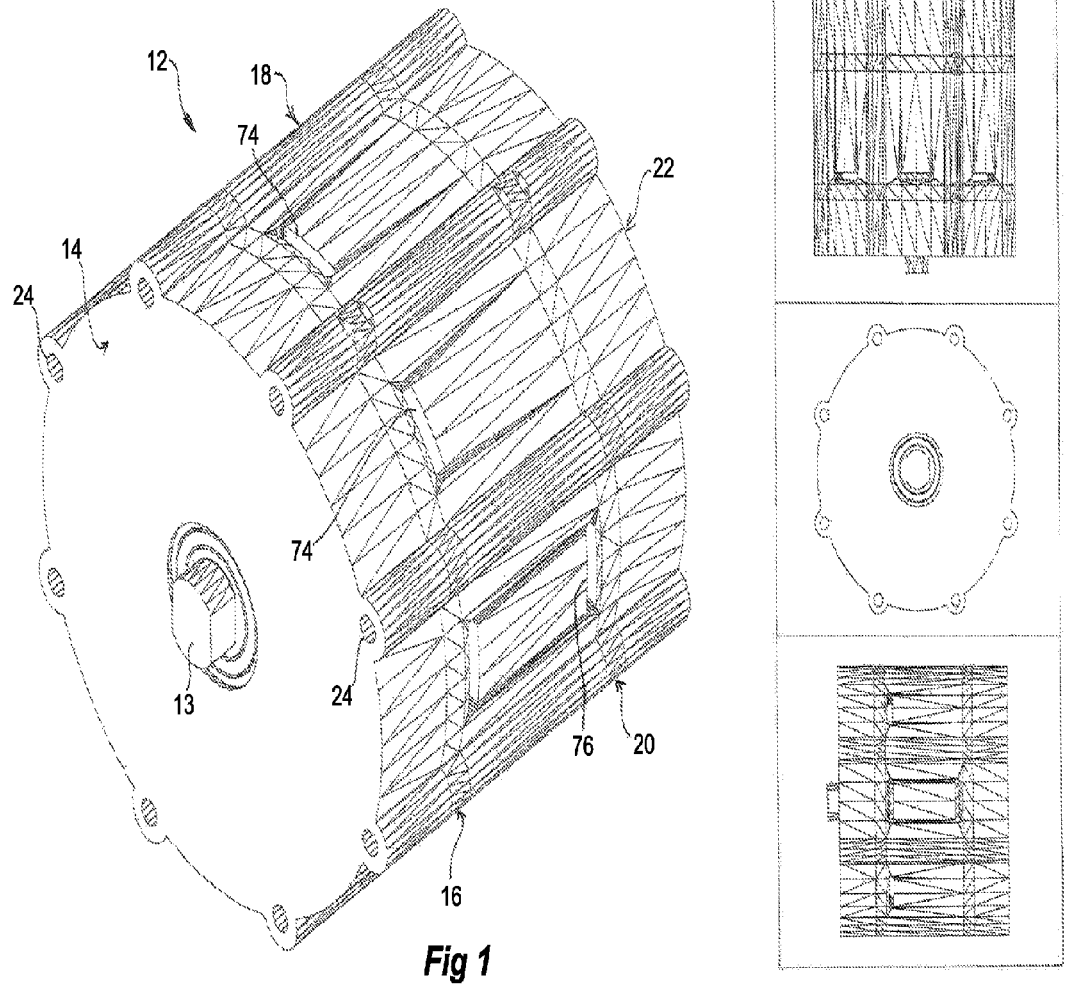
FIG. 1 illustrates a front perspective view and various additional views of an assembled fluid pump unit in accordance with an aspect of the present invention.

The main compression portion of the fluid compressor or pump apparatus 12 of an embodiment of the invention is shown generally in FIG. 1 with an assembled representation. The drive portion of the apparatus 12 which is used to continuously rotate an input shaft 13 is not shown so that the components of the compression portion are more easily viewable and because such drive components, such as electric motors and the like, are well known in the art.

Included in order from front to rear of the unit 12 is a front housing 14, a front plate 16, a main housing 18 which forms the main compression body, a rear plate 20, and rear housing 22.

Figure 10:
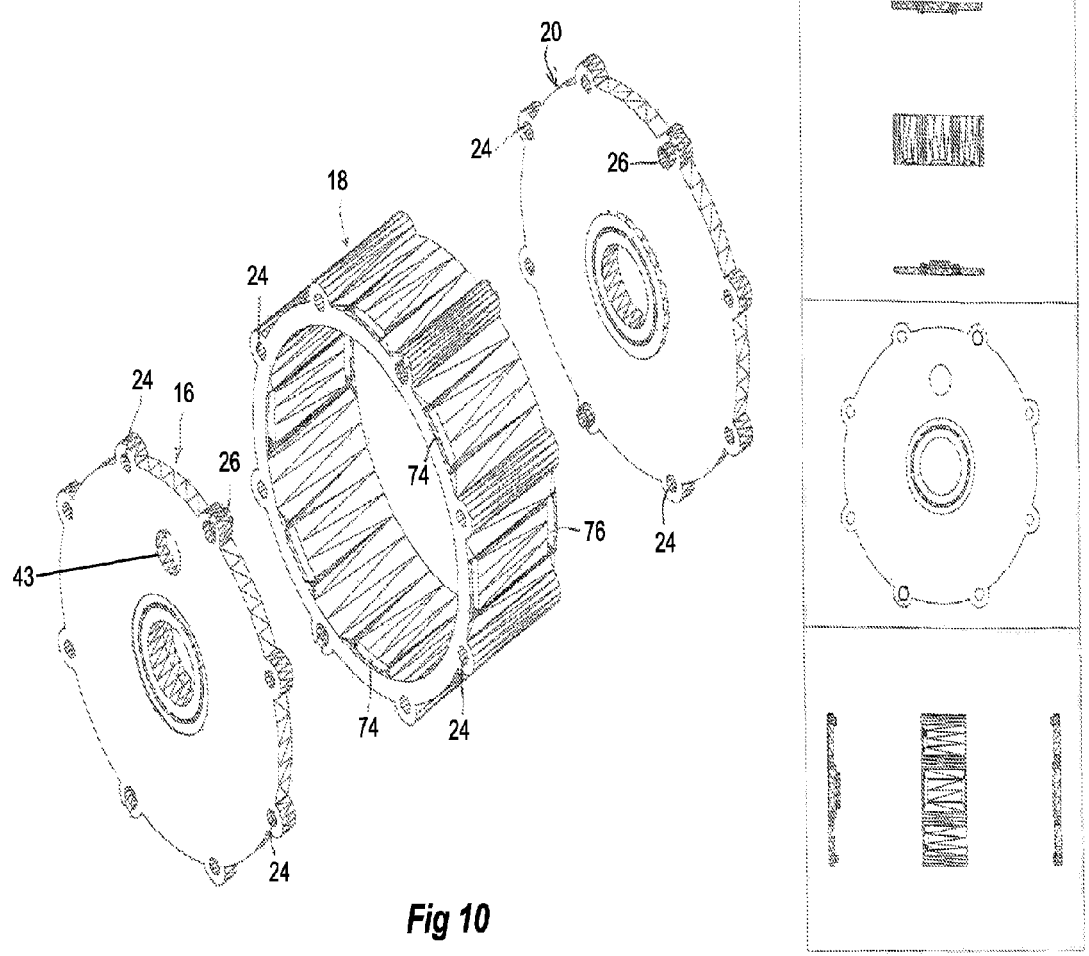
FIG. 10 illustrates a front, exploded perspective view and various additional views of the main housing of the pump and/or compressor of FIG. 1 including front and rear plates of the main housing.

Rods or bolts (not shown) can be extended up through guide holes 24, which are present and coaxial in each of the abovementioned components, so as to bring the components together. As shown in FIG. 10, locating dowels 26 can also be used in association with at least some of the guide holes 24 to ensure that each component is assembled in appropriate relative alignment.

As those skilled in the art would realize, the rods or bolts (not shown) would include threads adapted to be engaged by nuts (not shown) at the opposite end of the unit, or alternatively, by internal threads in the guide holes 24. Indeed, a combination of internally threaded holes and end nuts could be used to engage the bolts and thereby secure the components together.

Figure 2:
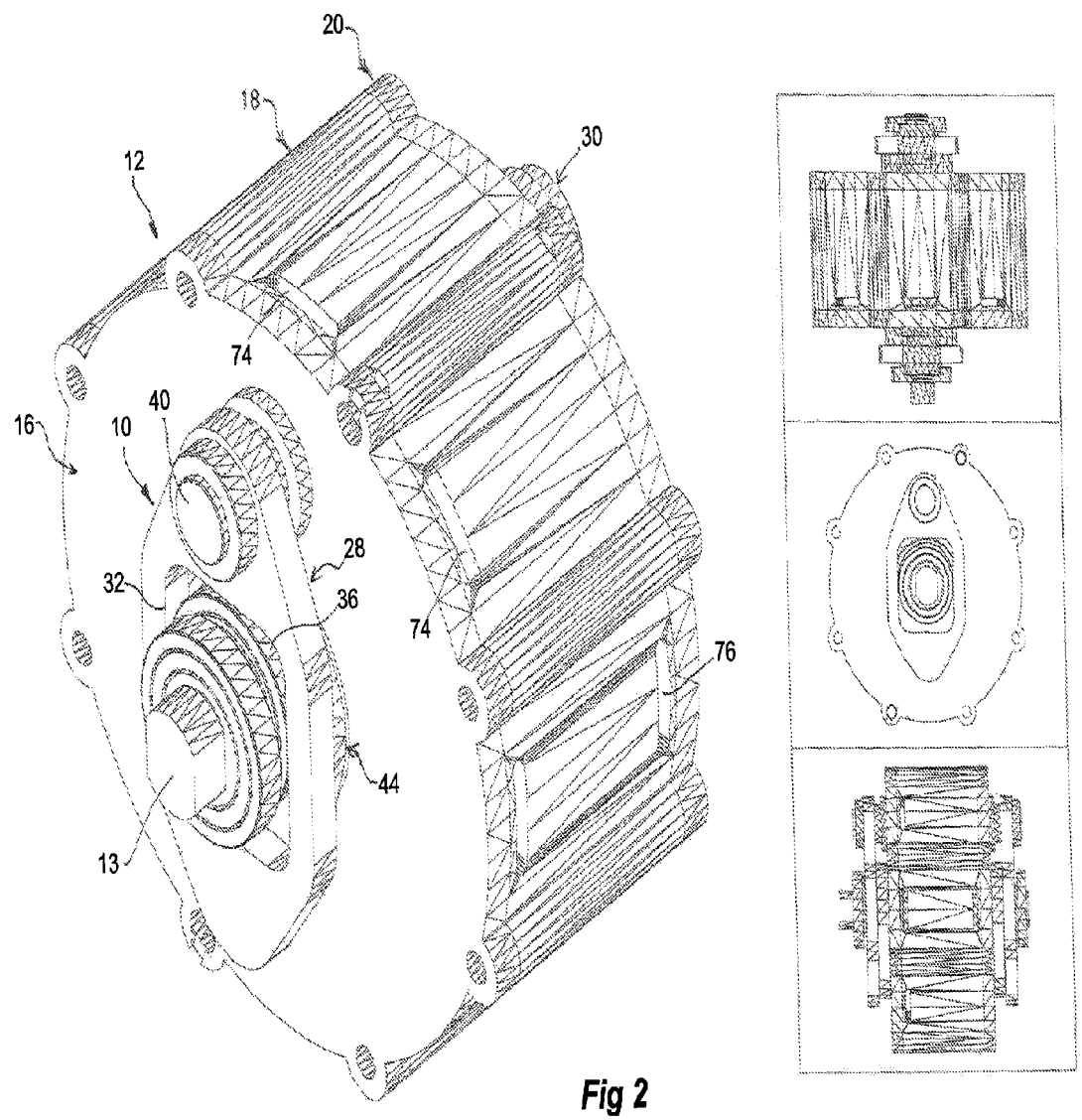
FIG. 2 illustrates a front perspective view of the pump unit of FIG. 1 with the front and rear housing removed, exposing a swing arm assembly configured in accordance with an aspect of the present invention.
Figure 3:
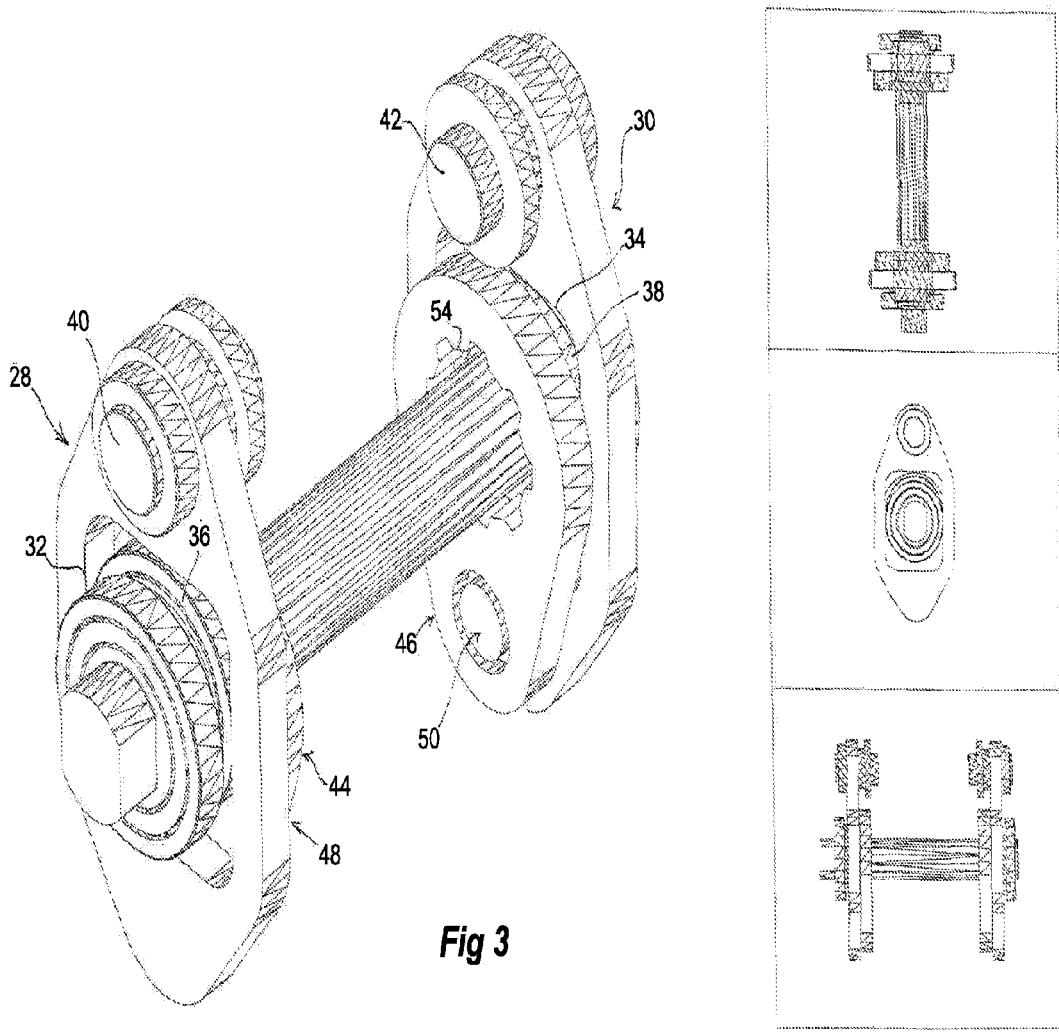
FIG. 3 illustrates a front perspective view and various additional views of the swing arm assembly of FIG. 2.

The components of the swing arm assembly 10 are shown more clearly in FIGS. 2 and 3. The assembly includes a front swing arm 28 and a rear swing arm 30. The input shaft 13 extends through respective identical openings 32/34 in each of the swing arm main bodies, and engage therewith via respective eccentric cams 36/38 disposed inside the openings. The eccentric cams 36/38 and respective openings 32/34 are dimensioned such that the cams contact the internal side walls of the openings to effect movement thereof when the eccentric cam is rotated.

Each swing arm is rotatable about a fixed upper hinge pin 40/42. At the front of the unit, the hinge pin 40 extends outwardly from the front plate 16 and FIG. 10 shows clearly an aperture 43 for receiving the pin. A central axis through each pin thus defines the axis about which each swing arm rotates. Hinge pin 42 at the rear of the unit is mounted to the rear plate 20 in an identical manner. The axis of the input shaft 13 is disposed a sufficient distance from the swing arm pivot axes to enable a swinging motion when the input shaft 13 and hence eccentric cams 36/38 are rotated. The eccentric cams 36 and 38 are arranged about the shaft 13 in a radially opposed manner such that when rotation of shaft 13 and cam 36 cause the front swing assembly 28 to swing in one direction, cam 38 causes the rear swing assembly 30 to swing in an equal and opposite motion, as will be discussed in more detail below.

Each swing arm further includes an inside lever arm 44/46 which is rotatable relative to its associated swing arm via a second hinge pin 48/50 joining the two components at their lower ends. Each lever arm 44/46 includes an internally splined aperture 52/54 at its upper end, through which extends the input shaft 13. The input shaft 13 thereby forms the axis of rotation of the lever arms 44/46, however, they are not connected such that rotation of the input shaft 13 causes rotation of the lever arm. The way in which the lever arm is connected at its upper end to other components of the unit 10 is described in more detail below. In operation, the lever arms 44/46 swing in a similar manner to the swing arm bodies.

Figure 4:
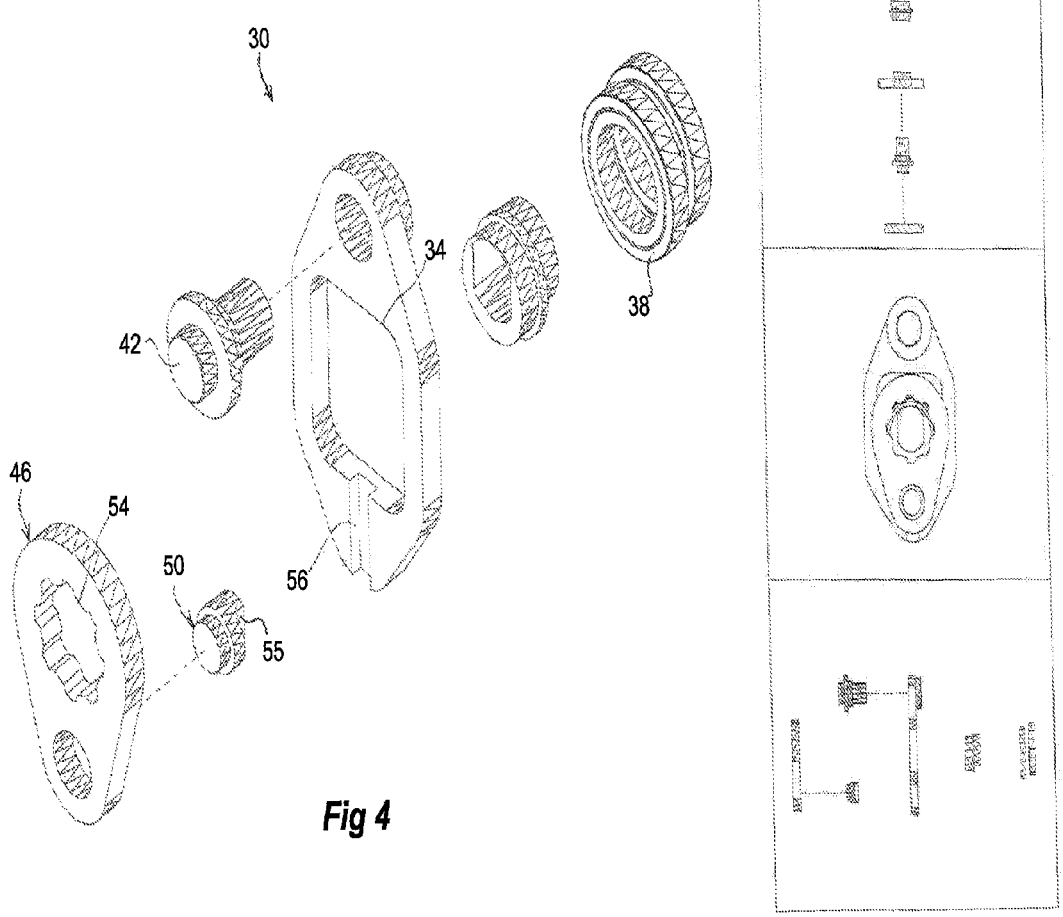
FIG. 4 illustrates a front, exploded perspective view and various additional views of the rear swing arm.
Figure 5:
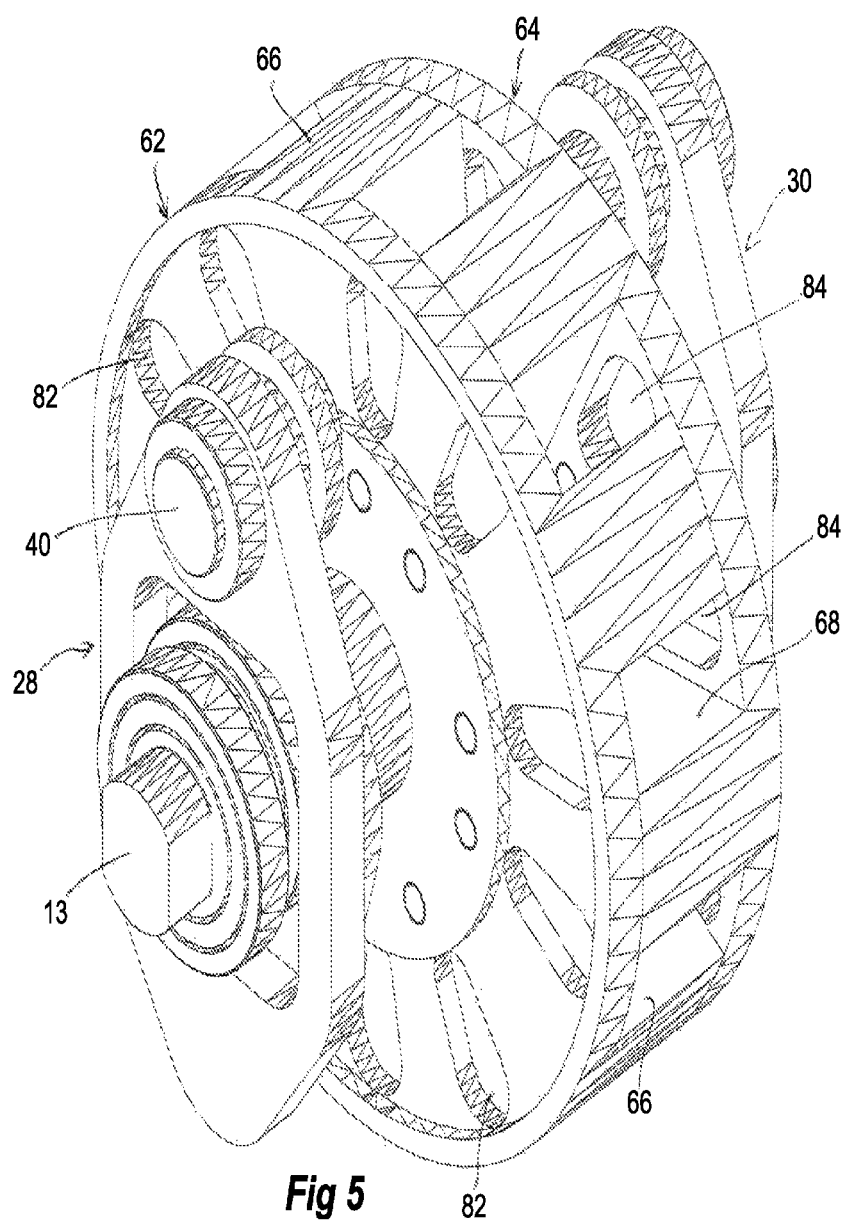
FIG. 5 illustrates in front perspective view of the internal components of the main housing of the pump unit including a front and rear vane member and the swing arm assembly of FIGS. 2-4.
Figure 6:
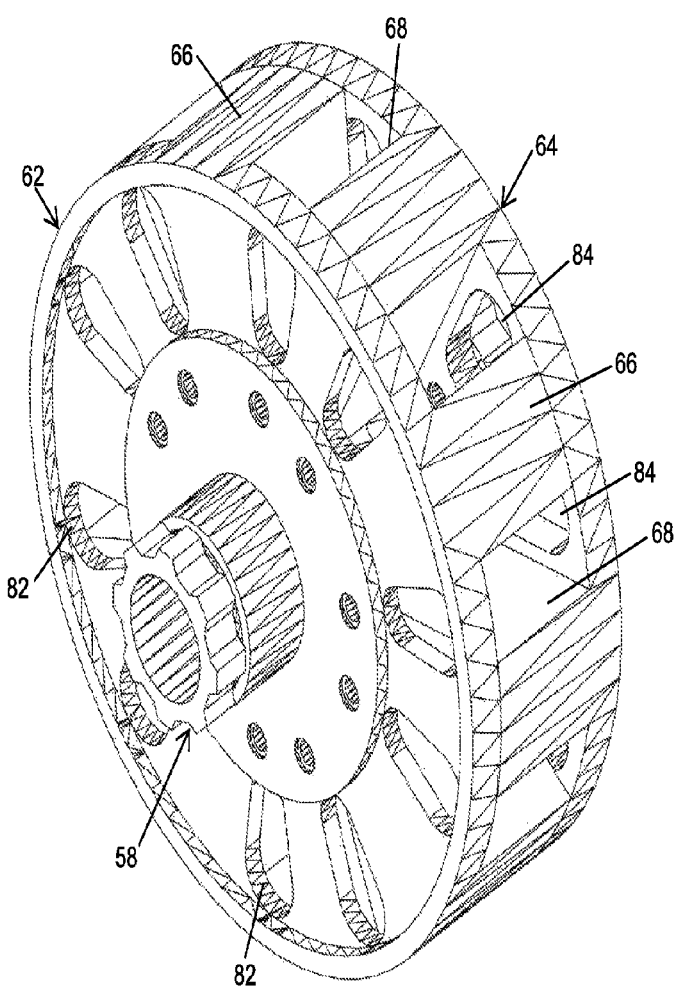
FIG. 6 illustrates a front perspective view and various additional views of the internal components of the main housing including the front and rear vane member, with the swing arm assembly removed.
Figure 6:
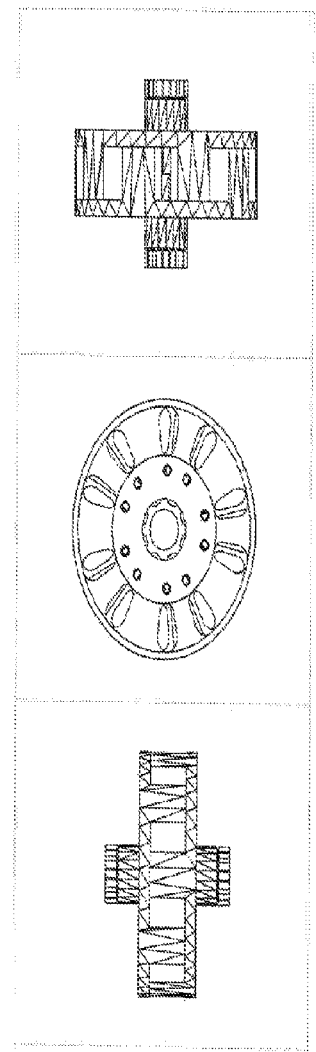
Figure 7:
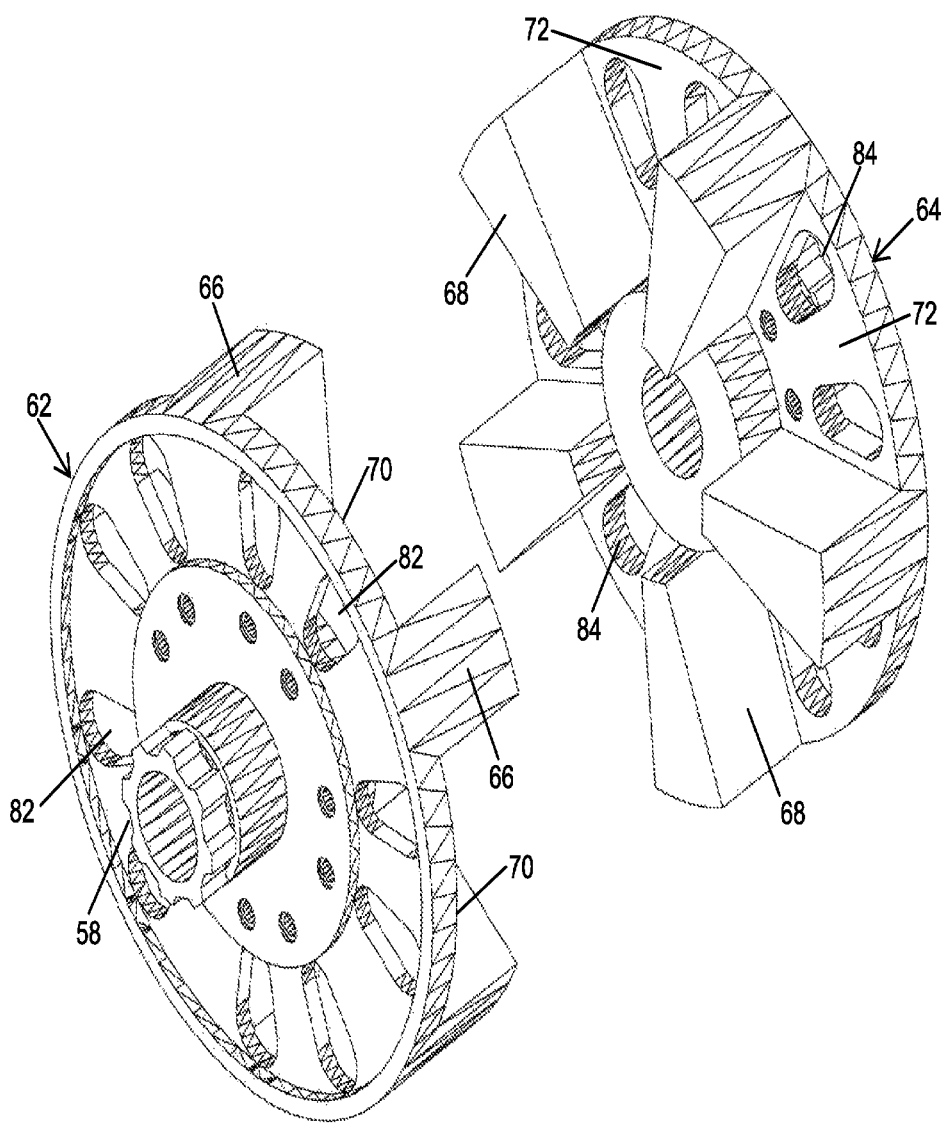
FIG. 7 illustrates a front, exploded perspective view of the front and rear vane members.

FIG. 4 shows the configuration of the second hinge pin 50 in more detail and, in particular, how the hinge pin includes an rearwardly directed, vertically extending male portion 55 adapted to be received in a corresponding female channel 56 at the lower end of the swing arm body such that the male portion 56 is able to slide up and down inside the channel 56 which provides a guide for the male portion. The skilled addressee would realize that when the swing arm bodies are made to swing by rotation of the eccentric cams, the lower pivot axis of the lever arms may cause the second hinge pin 50 to oscillate vertically, hence the need for a slideable connection between the male portion 56 and channel 56. It is to be understood however that other connection means could be used which allow for the same relative motion.

Turning now to FIGS. 5-9, it can be seen that each internally splined aperture 52/54 is adapted to mate with a corresponding, externally splined annulus 58/60 associated with front and rear vane members 62 and 64 respectively. Each vane member is housed inside the main housing 18 and includes a plurality of radially disposed vane segments 66/68 and open segments 70/72 therebetween. The segments are configured such that vane segments of one member are receivable in the open segments of the other, and vice versa, and the open segments are of a sufficient dimension to allow for subsequent rotation of the vane segments.

Therefore, at the front of the unit, the splined aperture of each lever arm is adapted to slide over the splined annulus of the front and rear vane members, and mate such that rotation of each lever arm about the input shaft axis causes corresponding rotation of the mating annulus and hence rotation of each of the vane members.

It should now be understood how constant rotational motion of the input shaft 13 causes equal and opposite rotational oscillation of the front and rear vane members 62 and 64 about the shaft 13 inside the main housing 18. Rotation of the input shaft causes rotation of the front and rear eccentric cams 36 and 38. Because these cams are arranged in a radially opposed configuration, their horizontal movement is equal and opposite, meaning that when the front swing arm body is at its leftmost horizontal position, the rear swing arm body is at its rightmost position, resulting in an equal and opposite pendulum motion of the lower ends of each swing arm 28 and 30.

The front and rear lever arms 44 and 46 swing at their lower ends together with the lower ends of each swing arm, such motion causing the internally splined apertures 52 and 54 thereof to rotationally oscillate in an equal and opposite direction. Because each aperture is mated with a corresponding splined annulus 58 and 60 associated with each of the front and rear vane members 62 and 64 respectively, the vane segments 66 and 68 are also made to rotationally oscillate in equal and opposite directions. The skilled addressee would realize that such motion will cause adjacent vane segments of opposed front and rear vane members to move toward and away from one another simultaneously forming a bellow effect. The benefit to this bellow effect will be described in more detail below.

In summary, the swing arm assembly 10 of the present invention is able to translate the continuous rotational movement of a shaft 13 from a driving mechanism such as a motor and so forth into oscillated movements of the front and rear vane members 62 and 64 and their associated vane segments inside the compressor chamber.

As can be interpreted from the illustrations relating to FIGS. 1-2 and also FIG. 10, fluid is able to be admitted into the main compression portion 18 of the fluid compressor or pump apparatus via inlet ports 74 spaced appropriately at the front and around the main housing 18, and admitted out via outlet ports 76 spaced appropriately at the rear and around the main housing 18. The mating vane members are sized axially shorter than the distance between the inlet and outlet ports such that an inlet chamber is provided between the front plate 16 and front vane member 62, and an outlet chamber is provided between the rear vane member 64 and rear plate 20. It is through these narrow chambers that air (or liquid or other) is sucked into or out of the compression chamber, and involved in this process are front and rear reed valve mechanisms 78 and 80 associated with each of the front and rear vane members respectively, as shown in FIGS. 8 and 9 and described below.

Figure 8:
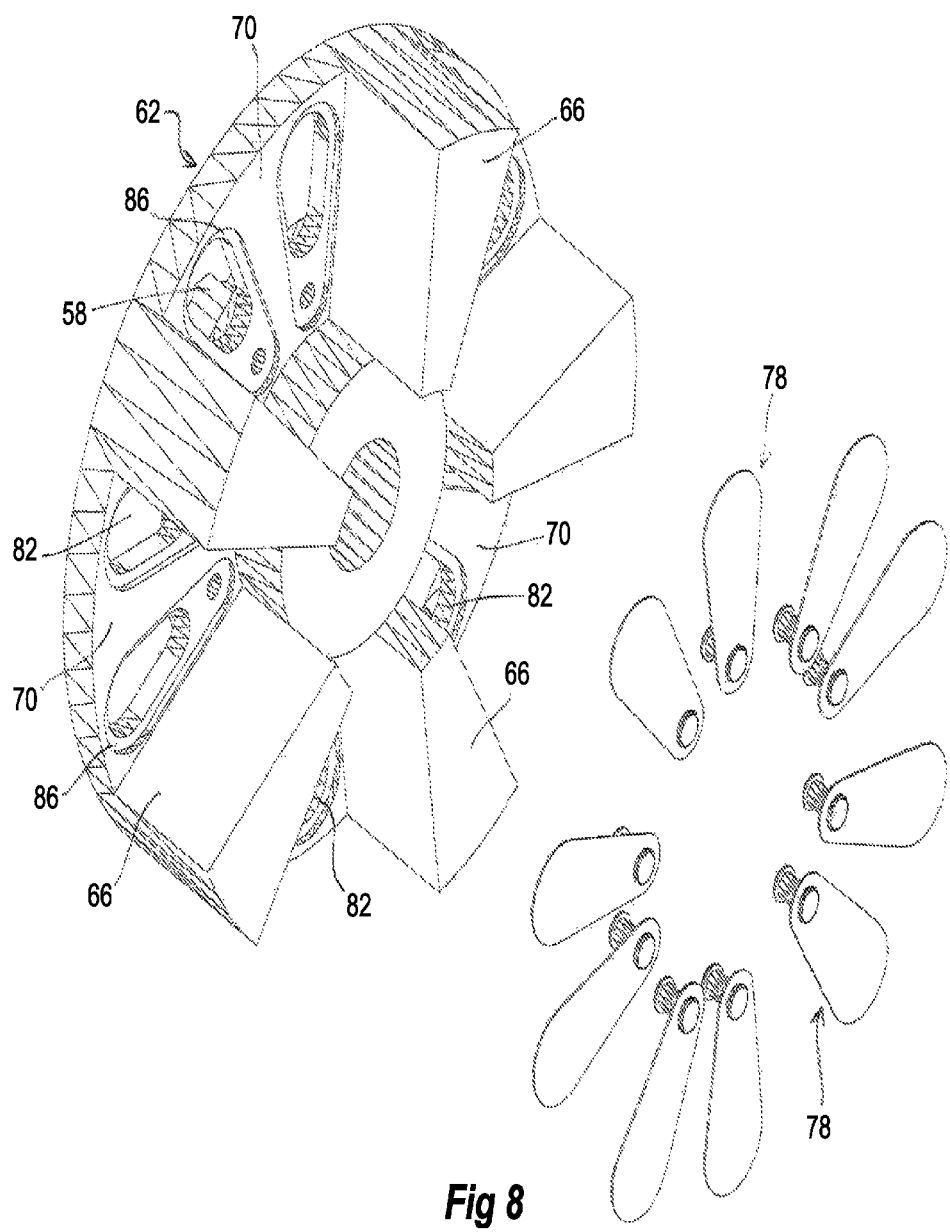
FIG. 8 illustrates a rear, exploded perspective view of the front vane member including an associated reed valve arrangement.
Figure 9:
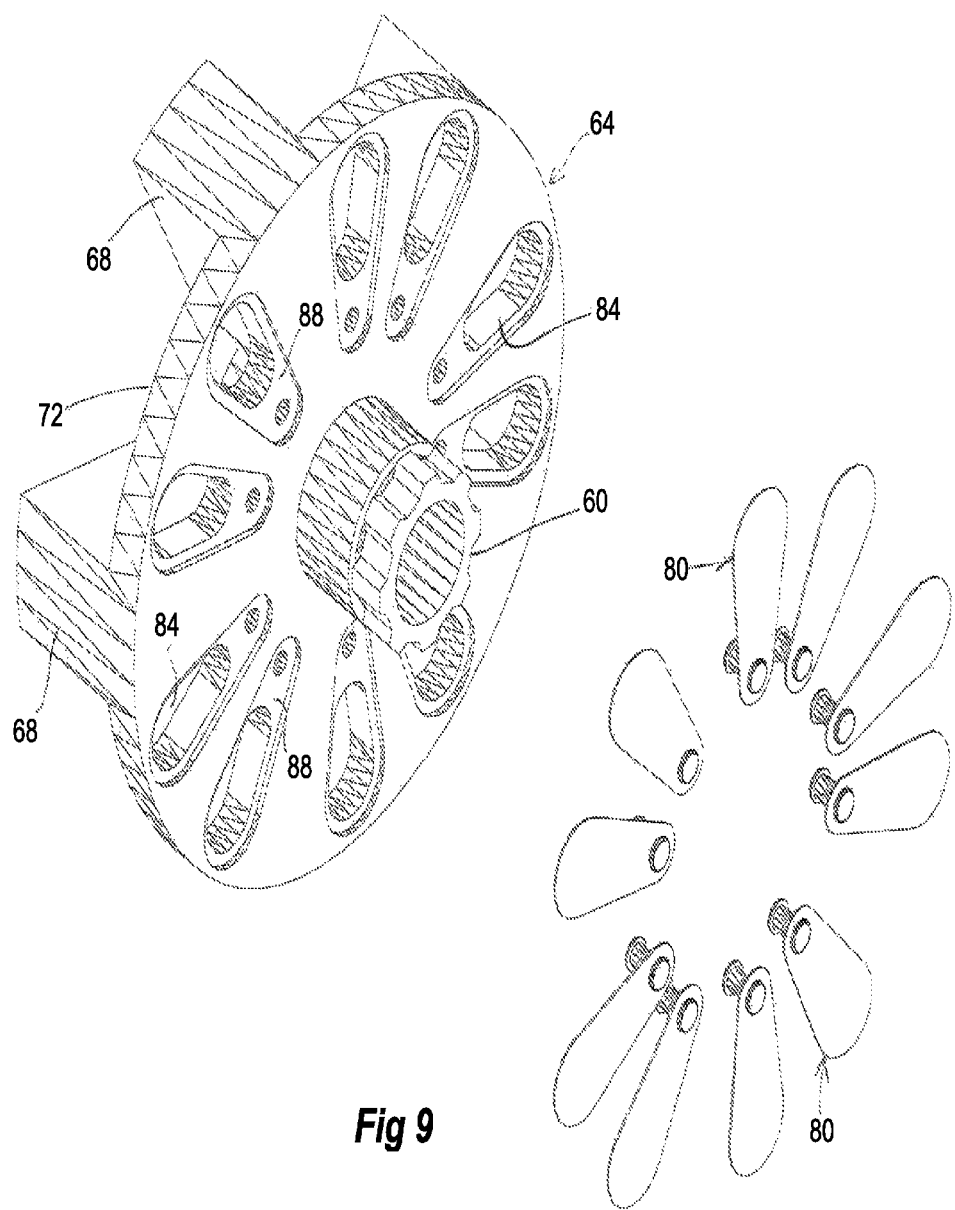
FIG. 9 illustrates a rear, exploded perspective view of the rear vane member including an associated reed valve arrangement.

FIGS. 8 and 9 in particular show how reed valves are associated with each of the front and rear vane members. Each reed valve is associated with a reed valve aperture 82/84 extending through the vane member, covered when the reed valve is closed to prevent flow through and uncovered to allow flow through when the reed valve is opened. The skilled addressee would understand that reed valves work on the basis that they are normally closed by action of a spring but can be forced opened when sufficient pressure is applied.

In the embodiment shown, each of the vane members includes two reed valve apertures 82/84 in each of its open segments, and each vane segment 66/68 is rotatable inside the open segment 70/72 in which it is received between a first position, wherein the vane segment almost abuts with one of two vane segments on either side thereof and covers one of the two reed valve apertures in the open segment, and a second position in which the vane segment almost abuts with the vane section on the other side thereof and thereby covers the second reed valve aperture.

The reed valves 78 associated with the front vane member 62 are on the inside of the compression chamber, while the reed valves 80 associated with the rear vane member 64 are on the outside, according to an embodiment. The rear vane member 64 thus includes apertures 84 extending from each of what essentially become radial compartments defined between adjacent front and rear vane segments inside the compressor chamber. Therefore as the person skilled in the art can appreciate each radial compartment inside the compressor chamber, which in an embodiment may be ten compartments as shown in the drawings, effectively has one inlet aperture and one outlet aperture.

The skilled addressee would realize that because both the front and rear vanes oscillate in an equal and opposite motion, each vane segment need only rotate by half the angle that would otherwise be required to move from said first to second position if one of the members were stationary.

The admission of fluid into the respective radial compartments is controlled by the oscillating back and forth movement of each of the front and rear vane members 62 and 64 which is by virtue of the swing arm assembly 10.

In operation, when a vane segment 66 of the front vane member 62 is moving towards a vane segment 68 of the rear vane member 64, the inlet reed valve 78 inside that radial compartment would be closed while the outlet reed valve 80 inside that compartment will open and thereby release fluid from the chamber. Of the ten chambers in the embodiment shown, five would be releasing fluid in this manner during a cycle. In the other five compartments, the inlet reed valve 78 inside the adjacent radial compartments will be open while their outlet reed valves 80 will be closed, thus filling that chamber with fluid to be released when the vane segments change direction.

Thus while the radial compartment on one side of a vane member is sucking or admitting fluid, the radial compartment on the other side will be effectively discharging compressed fluid thereout. Fluid will be sucked in on one side whereas fluid on the side that compression is taking place will reach a level high enough to push the front valves into their recesses 86 (which is essential in order for the vane segments to be able to pass over these valves) and the rear valves outwardly from their recesses 88 for discharge.

When oscillation in one direction is completed and the vane segments commence their oscillation back, the same process occurs but in reverse whereby the five chambers that were previously discharging fluid become the five chambers that are sucking in fluid, and so on.

Thus, in one revolution of the input shaft, each swing arm may be configured to swing back and forth once. In such an embodiment, during each swing, five of the compartments are drawing fluid in while in the other five compartments fluid is being drawn out, so after one whole revolution of the input shaft and one back and forth swing of each of the swing arms, all ten compartments have drawn fluid in and pumped fluid out. It is to be understood however that the invention is not intended to be limited to any one number of vane member oscillations per input shaft revolution, nor to any one number of vanes and compartments associated with each vane member.

By virtue of the inlet and outlet reed valve apertures and associated reed valves, which are effectively one way control valves, the skilled addressee would understand that admission and discharge of fluid into and out of each chamber can only take place once it matches the resilience or pressure provided for by the valves. In this instance, the reed valves utilize springs (not shown), but other configurations are possible. Because reed valves are considered known in the art, their will not be described herein in further detail.

In an alternate embodiment, the inlet and outlet apertures could be formed in or through the vane segments themselves. The invention is not intended to be limited to any one means of allowing for the inlet and exit of fluid to and from the compression chamber.

In summary, the relative movement of the front and rear vane members 62 and 64 allows for the creation of radial compartments in the compressor chamber whereby the simultaneous rotation of a front vane segment and a rear vane segment toward one another creates a bellowing effect which provides an improved mechanism to which fluid can be admitted into the compressor chamber but also a means by which fluid can be compressed and discharged. Effectively this bellowing is creating a means by which a continuous admission of fluid can enter the compressor chamber and also a continuance of discharge of compressed fluid from the adjacent compressor chamber all within the same cycle.

Figure 11:
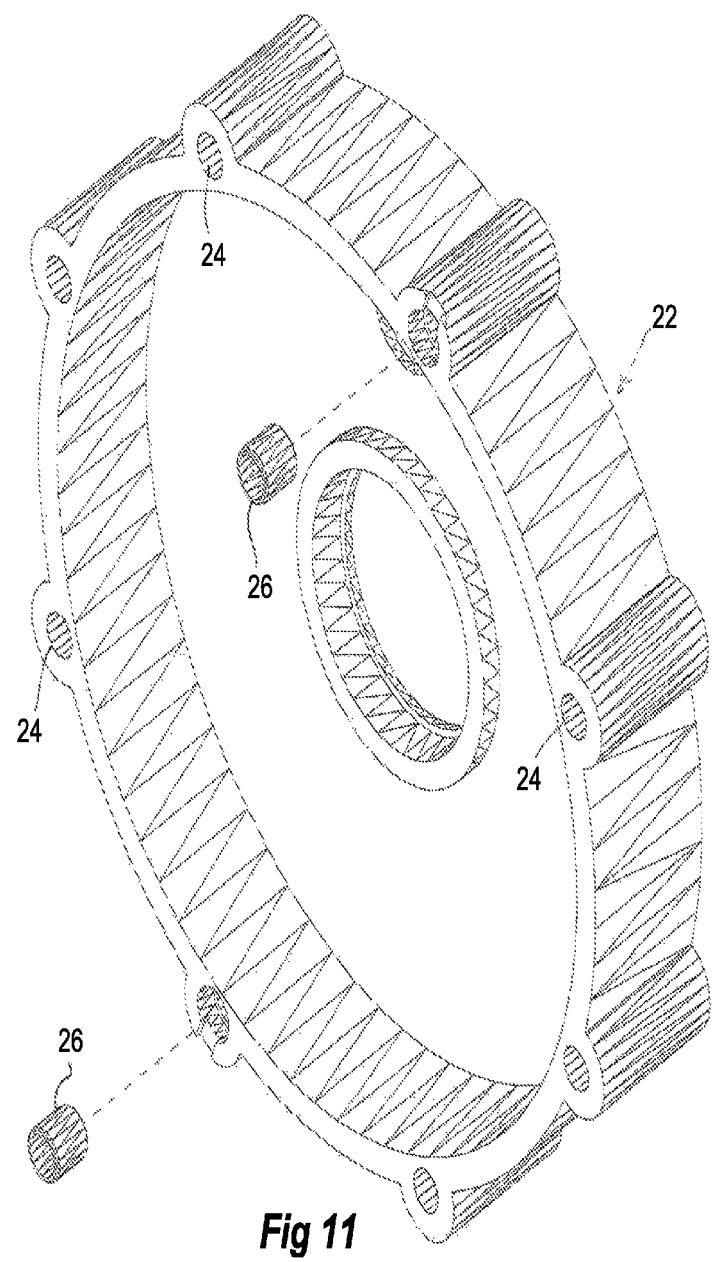
FIG. 11 illustrates a front perspective view of the rear housing of the pump unit of FIG. 1.

FIG. 11 illustrates the rear housing 22, and while the front housing 14 is not shown, it may be configured virtually identically to the rear housing, according to an embodiment. Both of these housings 14 and 22 are utilized to house and protect the respective swing arms 28 and 30.

An additional advantage afforded by the present invention is the equal and opposite balance of forces generated by the swing arms and vane members. This is critical in some applications, such as in the aircraft industry, where any slight vibrations from compressors and like equipment can result in fatigue and eventually failure. Efficiency has also been maximized in that the centre of gravity, when compared to the Applicant's own prior art compressor and/or pump unit for example, is halved, and therefore only half the amount of energy is required to do the same work. The end result is smooth and balanced operation and a smooth delivery of flow rate at the inlet/outlet.

Various components such as bearings and the like which are considered known in the art may be shown in the drawings but not described herein for the purpose of brevity. Furthermore, there may be components which have not been shown or received specific mention in this document such as various seals required to prevent fluid from being transferred unintentionally to adjacent compartments.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

Throughout this specification and claims which follow, unless the context requires otherwise, the word "comprise", and variations such as "comprises" and "comprising", will be understood to imply the inclusion of a stated integer or step, or group of integers or steps, but not the exclusion of any other integer or step or group of integers or steps.

The reference to any prior art in this specification is not, and should not be taken as, an acknowledgement or any suggestion that the prior art forms part of the common general knowledge in Australia.

The invention claimed is:

1. An apparatus for pumping or compressing a fluid, the apparatus characterised by:
   a compression chamber including an inlet and outlet;
   opposed front and rear vane members disposed along an axial direction inside said compression chamber, each vane member including a base, at least one vane segment extending axially from the base, and at least one radially disposed open segment adapted to receive a vane segment of the opposed vane member, wherein adjacent vane segments of the mating vane members faun radial compartments there between; and
   a means of effecting equal and opposite rotational oscillation of the front and rear vane members such that adjacent vane segments oscillate toward and away from one another simultaneously, thereby creating a bellowing effect which draws fluid into the compression chamber via the inlet and discharges fluid out of the chamber via the outlet,
   wherein the base of the front vane member includes inlet apertures disposed in each open segment of the front vane member to admit fluid to each radial compartment and the base of the rear vane member includes outlet apertures disposed in each open segment of the rear vane member to discharge fluid from each radial compartment, and
   wherein each open segment of the front vane member that receives a vane segment of the rear vane member includes at least two inlet apertures, the at least two inlet apertures arranged such that fluid is drawn in through a first of the at least two inlet apertures during rotation of the front and rear vane members in a first equal and opposite direction, and during which a second of the at least two inlet apertures is closed, and fluid is drawn in through the second of the at least two inlet apertures during rotation of the front and rear vane members in a second equal and opposite direction after the vane segment of the rear vane member has rotated beyond the second aperture, and during which the first of the at least two inlet apertures is closed.

2. An apparatus as characterised in claim 1 wherein:
   an inlet aperture disposed in a radial compartment formed between adjacent vane segments moving toward one another includes one way valve means configured to be closed to prevent admission of fluid into the radial compartment, the one way valve means configured to be opened when the adjacent vane segments move away from each other a sufficient distance to allow the one way valve means to open and admit fluid into the radial compartment, and an outlet aperture disposed in the radial compartment formed between adjacent vane segments moving towards one another includes one way valve means configured to be opened to enable discharge of fluid from the radial compartment.

3. An apparatus as characterised in claim 2 wherein said one way valve means are in the form of reed valves wherein the reed valves associated with the front vane member are configured to open into the radial compartments when not prevented from such movement.

4. An apparatus as characterised in claim 1 further including a drive portion supporting a rotatably driveable shaft in operable communication with a compression portion including said compression chamber.

5. An apparatus as characterised in claim 4 wherein said drive portion is an electric motor.

6. An apparatus as characterised in claim 1 wherein said means of effecting equal and opposite rotational oscillation of the front and rear vane members is a swing arm assembly adapted to translate the rotatable motion of the drivable shaft into a back and forth oscillation movement of the front and rear vane members.

7. An apparatus as characterised in claim 6 wherein said swing arm assembly includes a front swing arm disposed forwardly of said front vane member and a rear swing arm disposed rearwardly of said rear vane member, each swing arm having an opening there through for accommodating the driveable shaft, and wherein rotating front and rear eccentric cams are associated with the front and rear swing arms respectively.

8. An apparatus as characterised in claim 7 wherein each swing arm is moveable such that lower ends thereof are pivotable about a common pivot axis disposed above the driveable shaft axis in a pendulum motion, said pendulum motion being by virtue of contact between the rotating front and rear eccentric cams and an internal edge of each said openings.

9. An apparatus as characterised in claim 8 wherein a horizontal dimension of each front and rear swing arm opening is such that the respective front and rear eccentric cam contacts the internal edge on either side of each respective opening and thereby swings the respective front and rear swing arm when the driveable shaft is rotated.

10. An apparatus as characterised in claim 7 wherein the front and rear eccentric cams are arranged in a radially opposed configuration such that rotation of the driveable shaft causes the front and rear swing arms to move in equal and opposite directions.

11. An apparatus as characterised in claim 10 wherein each front and rear swing arm includes an axially disposed lever arm configured to swing in unison with the corresponding front and rear swing arm by virtue of a pivotable connection between each lever arm and corresponding front and rear swing arm lower end, the upper end of each lever arm being rotatable about the driveable shaft axis and associated with a corresponding one of said front and rear vane members to effect equal and opposite rotational oscillation of the front and rear vane members.

12. An apparatus as characterised in claim 11 wherein the upper end of each lever arm is internally splined and adapted to mate with a splined annulus associated with each vane member.

13. An apparatus as characterised in claim 7 wherein said compression chamber includes a main housing in which is housed said mating vane members, a front housing in which is housed said front swing arm, and a rear housing in which is housed said rear swing arm.

14. An apparatus as characterised in claim 13 wherein said compression chamber further includes front and rear plates disposed between the front and main housing and the main and rear housing respectively, wherein an inlet chamber is defined between said front plate and front vane member, and an outlet chamber is defined between said rear vane member and rear plate.

15. An apparatus as characterised in claim 14 wherein said compression chamber inlet and outlet are in the form of slots in said main housing extending into each of said inlet and outlet chambers respectively.

16. An apparatus as characterised in claim 6 wherein each opposed and mating front and rear vane member includes five radially disposed and axially extending vane segments, between which are defined the open segments for receiving opposed vane segments and allowing for their rotation, thereby defining ten radial compartments such that each revolution of the driveable shaft affords movement of each swing arm in one direction during which five of said ten radial compartments are drawing fluid in and five of said ten radial compartments are discharging fluid.

17. An apparatus as characterised in claim 1, wherein each open segment of the rear vane member that receives a vane segment of the front member includes at least two outlet apertures, the at least two outlet apertures arranged such that fluid is discharged through a first of the at least two outlet apertures during rotation of the front and rear vane members in a first equal and opposite direction, and during which a second of the at least two outlet apertures is closed, and fluid is discharged through the second of the at least two outlet apertures during rotation of the front and rear vane members in a second equal and opposite direction, and during which the first of the at least two outlet apertures is closed.

18. An apparatus as characterised in claim 1 wherein:

an inlet aperture disposed in a radial compartment formed between adjacent vane segments moving away from one another includes one way valve means configured to be open to enable admission of fluid into the radial compartment, the one way valve means configured to open when the adjacent vane segments move away from one another a sufficient distance to allow the one way valve means to open and enable admission of fluid into the radial compartment, and an outlet aperture disposed in the radial compartment formed between adjacent vane segments moving away from one another includes one way valve means configured to be closed to prevent discharge of fluid from the radial compartment.

19. An apparatus as characterised in claim 18 wherein said one way valve means are in the form of reed valves wherein the reed valves associated with the front vane member are configured to open into the radial compartments when not prevented from such movement.

20. An assembly for translating rotational motion of an input shaft having an axis of rotation into opposed rotational oscillatory motion of first and second members disposed along said axis of rotation, or vice versa, the assembly including:

a first swing arm disposed forwardly of said first members and a second swing arm disposed rearwardly of said second member, wherein each of the first swing arm, second swing arm, first member and second member includes a co-axial opening for accommodating the input shaft, and each swing arm is pivotable about a common pivot axis disposed a spaced distance from the input shaft axis of rotation;

eccentric cams associated with the input shaft and arranged such that each eccentric cam contacts an internal edge associated with the coaxial swing arm openings to thereby effect a pendulum type motion of the swing arms about said common pivot axis when the input shaft is rotated, said cams being arranged in a radially opposed configuration such that rotation of the input shaft causes the swing arms to move in equal and opposite rotational directions; and lever arms associated with each of said first and second swing arms, each lever arm configured to move substantially in unison with a corresponding first and second swing arm by virtue of a pivotable connection between each lever arm and corresponding first and second swing arm at a lower end of each of the first and second swing arm, the upper ends of each lever arm being rotatable about the input shaft axis of rotation and operatively coupled to a corresponding one of said first and second members to effect equal and opposite rotational oscillation of the first and second members.

21. An assembly as characterised in claim 20 wherein a horizontal dimension of each coaxial opening is such that the corresponding eccentric cam contacts the internal edge on opposed sides of the coaxial opening and thereby swings the corresponding first or second swing arm when the input shaft is rotated.

22. An assembly as characterised in claim 21 wherein the lever arms are disposed from corresponding first and second swing arms along said axis of rotation, and the upper end of each lever arm includes an internally splined aperture configured to mate with a splined annulus associated with each of the first and second members such that the pendulum type movement of the lower end of each lever arm causes the splined annuli and hence the first and second members to rotate about said shaft axis of rotation in said opposed oscillatory motion.

23. An assembly as characterised in claim 22 wherein said pivotable connection is a pin that is moveable with the lever arm and includes a male portion adapted to be received in a corresponding female channel at the lower end of the swing arm wherein slideable engagement between the male portion and the female channel enables the lower end of the lever arm to move in said pendulum type motion substantially in unison with the swing arm lower end.

24. An assembly as characterised in claim 20 wherein the first and second members are front and rear mating vane members and the first and second swing arms are front and rear swing arms associated with each of the front and rear mating vane members respectively, each mating vane member disposed inside a compression chamber which when caused to oscillate in opposite rotational directions cause pumping or compressing of fluid in said chamber.

25. An assembly as characterised in claim 24 wherein said compression chamber includes a main housing in which is housed said front and rear mating vane members, a front housing in which is housed said front swing arm, and a rear housing in which is housed said rear swing arm.

26. An apparatus as characterised in claim 20 further including a drive portion supporting the input shaft in operable communication with a compression portion including said compression chamber.

27. An apparatus for pumping or compressing a fluid, the apparatus characterised by:

a compression chamber including an inlet and outlet;

opposed front and rear vane members disposed along an axial direction inside said compression chamber, each vane member including at least one axially extending vane segment and at least one radially disposed open segment adapted to receive a vane segment of the opposed vane member, wherein adjacent vane segments of the mating vane members form radial compartments there between; and a means of effecting equal and opposite rotational oscillation of the front and rear vane members such that adjacent vane segments oscillate toward and away from one another simultaneously, thereby creating a bellowing effect which draws fluid into the compression chamber via the inlet and discharges fluid out of the chamber via the outlet, wherein said means of effecting equal and opposite rotational oscillation of the front and rear vane members is a swing arm assembly adapted to translate rotatable motion of a drivable shaft into a back and forth oscillation movement of the front and rear vane members, wherein said swing arm assembly includes a front swing arm disposed forwardly of said front vane member and a rear swing arm disposed rearwardly of said rear vane member, each swing arm having an opening there through for accommodating the driveable shaft, and wherein rotating front and rear eccentric cams are associated with the front and rear swing arms respectively, and wherein each swing arm is moveable such that lower ends thereof are pivotable about a common pivot axis disposed above the driveable shaft axis in a pendulum motion, said pendulum motion being by virtue of contact between the rotating front and rear eccentric cams and an internal edge of each said openings.

28. An apparatus for pumping or compressing a fluid, the apparatus characterised by:

a compression chamber including an inlet and outlet;

opposed front and rear vane members disposed along an axial direction inside said compression chamber, each vane member including at least one axially extending vane segment and at least one radially disposed open segment adapted to receive a vane segment of the opposed vane member, wherein adjacent vane segments of the mating vane members form radial compartments there between; and a means of effecting equal and opposite rotational oscillation of the front and rear vane members such that adjacent vane segments oscillate toward and away from one another simultaneously, thereby creating a bellowing effect which draws fluid into the compression chamber via the inlet and discharges fluid out of the chamber via the outlet, wherein said means of effecting equal and opposite rotational oscillation of the front and rear vane members is a swing arm assembly adapted to translate rotatable motion of a drivable shaft into a back and forth oscillation movement of the front and rear vane members, wherein said swing arm assembly includes a front swing arm disposed forwardly of said front vane member and a rear swing arm disposed rearwardly of said rear vane member, each swing arm having an opening there through for accommodating the driveable shaft, and wherein rotating front and rear eccentric cams are associated with the front and rear swing arms respectively, wherein the front and rear eccentric cams are arranged in a radially opposed configuration such that rotation of the driveable shaft causes the front and rear swing arms to move in equal and opposite directions, and wherein each front and rear swing arm includes an axially disposed lever arm configured to swing in unison with the corresponding front and rear swing arm by virtue of a pivotable connection between each lever arm and corresponding front and rear swing arm lower end, the upper end of each lever arm being rotatable about the driveable shaft axis and associated with a corresponding one of said front and rear vane members to effect equal and opposite rotational oscillation of the front and rear vane members.

29. An apparatus for pumping or compressing a fluid, the apparatus characterised by:

a compression chamber including an inlet and outlet;

opposed front and rear vane members disposed along an axial direction inside said compression chamber, each vane member including at least one axially extending vane segment and at least one radially disposed open segment adapted to receive a vane segment of the opposed vane member, wherein adjacent vane segments of the mating vane members form radial compartments there between; and a means of effecting equal and opposite rotational oscillation of the front and rear vane members such that adjacent vane segments oscillate toward and away from one another simultaneously, thereby creating a bellowing effect which draws fluid into the compression chamber via the inlet and discharges fluid out of the chamber via the outlet, wherein said means of effecting equal and opposite rotational oscillation of the front and rear vane members is a swing arm assembly adapted to translate rotatable motion of a drivable shaft into a back and forth oscillation movement of the front and rear vane members, wherein said swing arm assembly includes a front swing arm disposed forwardly of said front vane member and a rear swing arm disposed rearwardly of said rear vane member, each swing arm having an opening there through for accommodating the driveable shaft, and wherein rotating front and rear eccentric cams are associated with the front and rear swing arms respectively, and wherein said compression chamber includes a main housing in which is housed said mating vane members, a front housing in which is housed said front swing arm, and a rear housing in which is housed said rear swing arm.

* * * * *

UNITED STATES PATENT AND TRADEMARK OFFICE
CERTIFICATE OF CORRECTION

PATENT NO. : 9,915,262 B2  
APPLICATION NO. : 14/375617  
DATED : March 13, 2018  
INVENTOR(S) : George Flenche Page 1 of 1

It is certified that error appears in the above-identified patent and that said Letters Patent is hereby corrected as shown below:

In the Claims

Column 10, Line 33, Claim 1, delete "faun" and insert -- form --

Signed and Sealed this  
Fifth Day of June, 2018

Andrei Iancu  
*Director of the United States Patent and Trademark Office*